United States Patent [19]

Wirth et al.

[11] 4,369,277
[45] Jan. 18, 1983

[54] PYRROLE-STABILIZED CHLORINE-CONTAINING THERMOPLASTICS

[75] Inventors: Hermann O. Wirth; Jürgen Büssing, both of Bensheim; Hans-Helmut Friedrich, Lautertal, all of Fed. Rep. of Germany

[73] Assignee: Ciba-Geigy Corporation, Ardsley, N.Y.

[21] Appl. No.: 276,301

[22] Filed: Jun. 22, 1981

[30] Foreign Application Priority Data

Jun. 27, 1980 [CH] Switzerland .......................... 4969/80
May 16, 1981 [CH] Switzerland .......................... 3168/81

[51] Int. Cl.³ .............................................. C08K 5/34
[52] U.S. Cl. .................................... 524/104; 524/114; 524/147
[58] Field of Search .................. 260/45.8 N, 45.8 NB, 260/326.44, 326.45; 524/104

[56] References Cited

U.S. PATENT DOCUMENTS

| | | | |
|---|---|---|---|
| 2,574,987 | 11/1951 | Shelley | 260/45.8 NB |
| 2,936,309 | 5/1960 | Bavley et al. | 260/326.45 |
| 3,404,159 | 10/1968 | Strobel et al. | 260/329 |
| 3,404,161 | 10/1968 | Strobel et al. | 260/332.2 |
| 3,478,053 | 11/1969 | Szmuszkovicz | 260/326.5 |
| 3,573,216 | 3/1971 | Strobel et al. | 252/300 |
| 4,267,083 | 5/1981 | Torloting | 260/45.8 N |
| 4,290,940 | 9/1981 | Wirth et al. | 260/23 XA |

OTHER PUBLICATIONS

Knorr et al., Ber., 35, 3004 (1902).
A. Treibs et al., Ann., 611, 139 (1958).
E. Bernary et al., Chem. Ber., 56, 44 (1923).
R. A. Jones, "Chemistry of Pyrroles", Academic Press, 1977.

*Primary Examiner*—John Kight, III
*Assistant Examiner*—R. A. White
*Attorney, Agent, or Firm*—Luther A. R. Hall

[57] ABSTRACT

Chlorine-containing thermoplastics containing a pyrrole of one of the formulae I to V

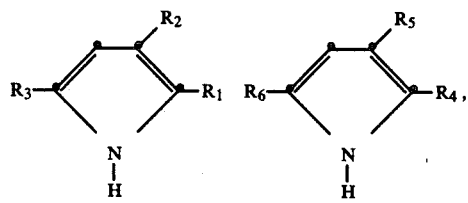

(I)   (II)

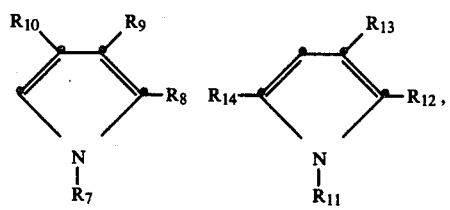

(III)   (IV)

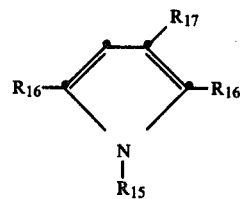

(V)

the substituents being as defined in the patent specification. The pyrroles are used to stabilize chlorine-containing thermoplastics.

9 Claims, No Drawings

PYRROLE-STABILIZED CHLORINE-CONTAINING THERMOPLASTICS

The present invention relates to the stabilisation of chlorine-containing thermoplastics by addition of pyrroles.

It is known that chlorine-containing polymers must be protected against the harmful effect of light and heat, for example when being converted to mouldings. Hitherto, it is in particular organo-tin compounds, metal carboxylates or aminocrotonates which have been used for this purpose. However, the stabilities achieved with these active ingredients are not always adequate for practical requirements.

U.S. Pat. Nos. 3,404,159, 3,573,216 and 3,404,161 disclose pyrrole-malonitriles which, because of their specific absorption between 250 and 400 μm, can be used as ultraviolet absorbers and light stabilisers, inter alia also for PVC. U.S. Pat. No. 3,478,053 discloses 2,3-diarylpyrroles for the same purpose. However, these patent specifications do not contribute to the development of improved heat stabilisers, this being the object of the present invention.

The invention relates to chlorine-containing thermoplastics containing a pyrrole of the formula I

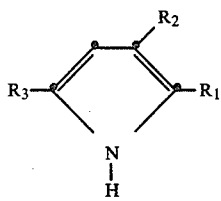

in which $R_1$ is alkyl, cycloalkyl, aryl, alkoxycarbonylmethyl, esterified or unesterified α-hydroxyalkyl, esterified or unesterified α-hydroxycycloalkylmethyl, esterified or unesterified α-hydroxyaralkyl, alkoxymethyl, alkylthiomethyl, aryloxymethyl, arylthiomethyl, cycloalkoxymethyl, cycloalkylthiomethyl, aralkoxymethyl, aralkylthiomethyl, alkoxy, alkylthio, cycloalkoxy, cycloalkylthio, aralkoxy, arylalkylthio, aryloxy, arylthio, mercapto, mercaptomethyl, hydroxyl, cyano, salified or unsalified carboxyl, acyl or halogen, with the proviso that if $R_1$ is halogen, $R_2$ must not be halogen at the same time, $R_2$ is hydrogen, alkyl, cycloalkyl, aryl, esterified or unesterified α-hydroxyalkyl, in which the alkyl moiety can also jointly with $R_1$ be alkylene, esterified or unesterified α-hydroxycycloalkylmethyl, esterified or unesterified α-hydroxyaralkyl, alkoxy, cycloalkyloxy, aralkoxy, aryloxy, alkylthio, cycloalkylthio, aralkylthio, arylthio, alkoxymethyl, alkylthiomethyl, aryloxymethyl, arylthiomethyl, cycloalkoxymethyl, cycloalkylthiomethyl, aralkoxymethyl, arylalkylthiomethyl, hydroxyl, mercapto, mercaptomethyl or halogen, with the proviso that if $R_2$ is halogen, $R_1$ must not be halogen at the same time, and $R_3$ is hydroxyl or mercapto, or of the formula II

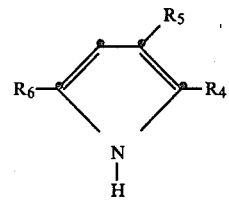

in which $R_4$ and $R_6$ are defined as for $R_2$, with the exclusion of hydrogen, but can both be halogen simultaneously, and $R_4$ can also be salified or unsalified carboxyl, acyl or cyano, and $R_5$ is defined like $R_3$, or of the formula III

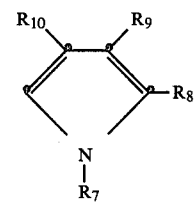

in which $R_7$ is alkyl, cycloalkyl, aryl, acyl or alkoxycarbonylalkyl, $R_8$ and $R_9$ are defined like $R_2$ and can both be halogen or hydrogen, and either $R_8$ or $R_9$ can additionally be salified or unsalified carboxyl, acyl or cyano, and $R_{10}$ is defined like $R_3$, or of the formula IV

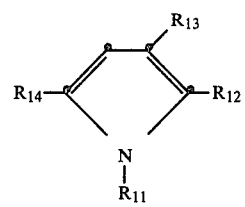

in which $R_{11}$ is defined like $R_7$, $R_{12}$ like $R_1$ and $R_{13}$ like $R_2$, and $R_{12}$ and $R_{13}$ can both be hydrogen or halogen, and $R_{14}$ is defined like $R_3$, or of the formula V

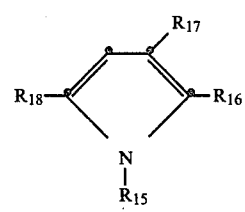

in which $R_{15}$ is defined like $R_7$, $R_{16}$ like $R_1$, $R_{17}$ like $R_3$ and $R_{18}$ like $R_2$, and $R_{16}$ and $R_{18}$ can both be hydrogen or halogen.

It has been found, surprisingly that the pyrroles used according to the invention are exceptionally efficient stabilisers, especially for PVC, which do not exhibit the disadvantages of the prior art, or do so only to a reduced extent, and which, in particular, do not necessarily have to be combined with metal compounds.

$R_1$ is alkyl in particular has 1 to 6 C atoms and is, for example, ethyl, n-propyl or especially methyl. $R_1$ as cycloalkyl in particular has 5 to 8 C atoms and is, in particular, cyclohexyl or cyclopentyl. $R_1$ as aryl is phenyl which is unsubstituted or substituted, for example by $C_{1-6}$-alkyl, such as methyl, $C_{1-6}$-alkoxy, such as methoxy, and/or hydroxyl (for example in the m-position), but in particular is phenyl itself. $R_1$ as alkoxycarbonylmethyl in particular has 1 to 18 C atoms in the alkoxy moiety, examples being methoxycarbonylmethyl or ethoxycarbonylmethyl. $R_1$ as α-hydroxyalkyl in particular has 1 to 6 C atoms, examples being hydroxymethyl or α-hydroxyethyl, and is in particular esterified with alkylcarbonyl or arylcarbonyl, as stated for acyl $R_1$. $R_1$ as α-hydroxycycloalkylmethyl in particular has 6 to 12 C atoms, examples being hydroxy-(cyclohexyl)-methyl, which can be esterified as above. $R_1$ as α-hydroxyaralkyl in particular has 7 to 12 C atoms, an example being α-hydroxybenzyl, which can be esterified as above. $R_1$ as cycloalkoxymethyl in particular has 6 to 12 C atoms, an example being cyclohexyloxymethyl, and a similar remark applies to cycloalkylthiomethyl. $R_1$ as aralkoxymethyl or aralkylthiomethyl in particular has 8 to 13 C atoms, an example being benzyloxymethyl. $R_1$ as alkoxy in particular has 1 to 6 C atoms, an example being methoxy. $R_1$ as alkylthio in particular has 1 to 6 C atoms, an example being methylthio. $R_1$ as alkoxymethyl and alkylthiomethyl in particular has 1 to 18 C atoms in the alkyl moiety, examples being methoxymethyl, ethoxymethyl, methylthiomethyl or ethylthiomethyl. In aryloxymethyl and arylthiomethyl $R_1$, aryl is in particular substituted or unsubstituted phenyl, examples of $R_1$ being phenoxymethyl or phenylthiomethyl.

$R_1$ as salified carboxyl is in particular carboxyl salified with one equivalent of calcium, barium, zinc, cadmium, antimony, diorgano-tin, such as dialkyl-tin, or especially magnesium.

Acyl $R_1$ is, in particular, formyl, alkylcarbonyl, arylcarbonyl or free, esterified or amidised carboxyl.

$R_1$ as alkylcarbonyl in particular has 2 to 19 C atoms, examples being propionyl, butyryl, lauroyl or especially acetyl. $R_1$ as arylcarbonyl in particular has 7 to 19 C atoms, examples being unsubstituted and substituted benzoyl, especially benzoyl itself. $R_1$ as esterified carboxyl is in particular esterified with a monohydric, dihydric, trihydric or tetrahydric aliphatic, cycloaliphatic or aralipathic alcohol having 1 to 20 C atoms, a dihydric alcohol preferably being esterified with two, a trihydric alcohol preferably with three, and a tetrahydric alcohol preferably with four, pyrrolecarboxylic acid molecules. Examples of suitable monohydric alcohols are $C_1$–$C_{18}$-alkanols, such as methanol, ethanol, n-octanol or lauryl alcohol, $C_5$–$C_{19}$-aralkanols, such as benzyl alcohol or furfuryl alcohol, or $C_5$–$C_8$-cycloalkanols, such as cyclohexanol. Examples of suitable dihydric alcohols are $C_2$–$C_{20}$-alkanediols, such as ethylene glycol or 1,2-butylene glycol, $C_4$–$C_{20}$-oxaalkanediols, such as 3-oxa-1,5-dihydroxypentane, or $C_4$–$C_{20}$-thiaalkanediols, such as 3-thia-1,5-dihydroxypentane. Examples of suitable trihydric alcohols are $C_3$–$C_{20}$-alkanetriols, such as glycerol, or tris-β-hydroxyethyl isocyanurate, and examples of suitable tetrahydric alcohols are $C_4$–$C_{20}$-alkanetetrols, such as pentaerythritol. A particularly preferred meaning of $R_1$ is ($C_1$–$C_{18}$-alkoxy)-carbonyl. $R_1$ as amidised carboxyl is in particular arylaminocarbonyl, in which aryl in particular has 6 to 18 C atoms, examples being unsubstituted or substituted, for example $C_1$–$C_6$-alkyl-, $C_1$–$C_6$-alkoxy- and/or hydroxy-substituted, phenylaminocarbonyl, especially phenylaminocarbonyl itself or m-hydroxyphenylaminocarbonyl, or ($C_1$–$C_{18}$-alkyl)-aminocarbonyl, such as methylaminocarbonyl or ethylaminocarbonyl. Suitable alcohols in an esterified carboxyl group are especially those which contain epoxy groups, such as monohydric alcohols of this type, examples of esterified carboxyl then being a glycidyl ester or an epoxidised oleyl ester. Where $R_2$, $R_4$, $R_6$, $R_7$, $R_8$, $R_9$, $R_{11}$, $R_{12}$, $R_{13}$, $R_{15}$, $R_{16}$ and $R_{18}$ have the meanings also given for $R_1$, the remarks made concerning $R_1$ apply analogously. $R_1$, $R_2$, $R_4$, $R_6$, $R_8$, $R_9$, $R_{12}$, $R_{13}$, $R_{16}$ and $R_{18}$ as halogen are, for example, bromine, fluorine and especially chlorine.

The meanings of the individual substituents in a given compound are independent of one another.

Preferably, the chlorine-containing thermoplastics according to the invention contain pyrroles of the formulae I to V, in which $R_1$ is alkyl, aryl, alkoxy, aryloxy or acyl, $R_2$ is alkyl, aryl, alkoxy, aryloxy or hydroxyl, $R_3$ is hydroxyl, $R_4$ is alkyl, aryl, alkoxy, aryloxy or acyl, $R_5$ is hydroxyl, $R_6$ is alkyl, aryl, alkoxy, aryloxy or hydroxyl, $R_7$ is alkyl, aryl or acyl, $R_8$ is hydrogen, alkyl, aryl, alkoxy, aryloxy, hydroxyl or acyl, if $R_9$ is not acyl at the same time, $R_9$ is hydrogen, alkyl, aryl, alkoxy, aryloxy, hydroxyl or acyl, if $R_8$ is not acyl at the same time, $R_{10}$ is hydroxyl, $R_{11}$ is alkyl, aryl or acyl, $R_{12}$ is alkyl, aryl, alkoxy, aryloxy or acyl, $R_{13}$ is alkyl, aryl, alkoxy, aryloxy or hydroxyl, $R_{14}$ is hydroxyl, $R_{15}$ is alkyl, aryl or acyl, $R_{16}$ is hydrogen, alkyl, aryl, alkoxy, aryloxy or acyl, $R_{17}$ is hydroxyl and $R_{18}$ is hydrogen, alkyl, aryl, alkoxy, aryloxy or hydroxyl.

Particularly preferred pyrroles of the formulae I to V are those in which $R_1$ is methyl, phenyl, methoxy, phenyloxy, acetyl or benzoyl, $R_2$ is methyl, phenyl, methoxy, phenyloxy or hydroxyl, $R_3$ is hydroxyl, $R_4$ is methyl, phenyl, methoxy, phenyloxy, acetyl, benzoyl or phenylaminocarbonyl, $R_5$ is hydroxyl, $R_6$ is methyl, phenyl, methoxy, phenyloxy or hydroxyl, $R_7$ is methyl, phenyl or acetyl, $R_8$ is hydrogen, methyl, phenyl, methoxy, phenyloxy, acetyl, benzoyl, phenylaminocarbonyl or hydroxyl, $R_9$ is hydrogen, methyl, phenyl, methoxy, phenyloxy, acetyl, benzoyl, phenylaminocarbonyl or hydroxyl, $R_{10}$ is hydroxyl, $R_{11}$ is methyl, phenyl or acetyl, $R_{12}$ is methyl, phenyl, methoxy, phenyloxy, acetyl, benzoyl or phenylaminocarbonyl, $R_{13}$ is methyl, phenyl, methoxy, phenyloxy or hydroxyl, $R_{14}$ is hydroxyl, $R_{15}$ is methyl, phenyl or acetyl, $R_{16}$ is hydrogen, methyl, phenyl, methoxy, phenyloxy, acetyl or benzoyl, $R_{17}$ is hydroxyl and $R_{18}$ is methyl, phenyl, methoxy, phenyloxy or hydroxyl.

Pyrroles of the formula V are preferred, and those of the formulae II and III are particularly preferred.

Examples of pyrroles of the formula I are (a) 2-methyl-3-phenyl-5-hydroxy-pyrrole, (b) 2-acetyl-3-methoxy-5-hydroxy-pyrrole, (c) 2-phenyl-3-methyl-5-hydroxy-pyrrole, (d) 2-methoxy-3-phenyl-5-hydroxy-pyrrole, (e) 2,3-di-phenyloxy-5-mercapto-pyrrole, (f) 2-phenyl-3,5-di-hydroxy-pyrrole and (g) 2-acetyl-3,5-di-hydroxy-pyrrole.

Examples of pyrroles of the formula II are (a) 2-acetyl-3-hydroxy-5-methyl-pyrrole, (b) 2-methoxy-3-hydroxy-5-phenyl-pyrrole, (c) 2-phenyl-3-hydroxy-5-methoxy-pyrrole and (d) 2-acetyl-3,5-di-hydroxy-pyrrole.

Examples of pyrroles of the formula III are (a) N-methyl-2,3-di-phenyl-4-hydroxy-pyrrole, (b) N-phenyl-2,3-di-phenyloxy-4-hydroxy-pyrrole, (c) N-acetyl-2,3-di-methoxy-4-hydroxy-pyrrole, (d) N-methyl-2-methyl-3-acetyl-4-hydroxy-pyrrole, (e) N-phenyl-3,4-di-hydroxy-pyrrole and (f) N-methyl-3-acetyl-4-hydroxy-pyrrole.

Examples of pyrroles of the formula IV are (a) N-methyl-2,3-di-phenyl-5-hydroxy-pyrrole, (b) N-phenyl- 2-acetyl-3-methoxy-5-hydroxy-pyrrole, (c) N,2-di-phenyl-3-methyl-5-hydroxy-pyrrole, (d) N,2-di-acetyl-3,5-di-hydroxy-pyrrole, (e) N-phenyl-2-phenylaminocarbonyl-3,5-di-hydroxy-pyrrole and (f) N-acetyl-2-methyl-3,5-di-hydroxy-pyrrole.

Examples of pyrroles of the formula V are (a) N,2,5-tri-phenyl-3-hydroxy-pyrrole, (b) N,5-di-methyl-3-hydroxy-pyrrole, (c) N-acetyl-3,5-di-hydroxy-pyrrole, (d) N-methyl-2-acetyl-3,5-di-hydroxy-pyrrole, (e) N-methyl-3-hydroxy-5-phenyl-pyrrole and (f) N-phenyl-2,3,5-tri-hydroxy-phenyl-pyrrole.

Preferred pyrroles are 2,3-di-phenyl-5-hydroxy-pyrrole, 2,5-di-phenyl-3-hydroxy-pyrrole, N-phenyl-2-methyl-3-phenylaminocarbonyl-4-hydroxy-pyrrole, 2-ethyloxycarbonyl-3-hydroxy-5-methyl-pyrrole or N-phenyl-3-hydroxy-4-ethyloxycarbonyl-5-methyl-pyrrole.

Pyrroles are compounds which have been known for a long time. Thus, Knorr and Lange, in Ber. 35, 3004 (1902), describe the preparation of pyrroles by reacting aminoketones, such as aminoacetophenone or aminoacetone, with an acylacetone, such as ethyl acetoacetate, or acetylacetone. The preparation of 2-ethyloxycarbonyl-3-hydroxy-5-methyl-pyrrole is described by A. Treibs and A. Ohovodnik in Ann. 611, 139–49 (1958). In Chem. Ber. 56, 44 (1923), E. Benary and R. Konrad describe the preparation of N-phenyl-3-hydroxy-4-ethoxycarbonyl-5-methyl-pyrrole. A summary of pyrrole chemistry has been published in the Monograph by R. A. Jones, "The Chemistry of Pyrroles", Academic Press 1977.

The pyrroles are incorporated into the chlorine-containing thermoplastics which are to be stabilised, prior to processing of the latter, in general in amounts of 0.05 to 5, preferably of 0.1 to 3, % by weight relative to the chlorine-containing thermoplastic, and in conventional equipment.

A still further improved stabilising action is obtained with the additional use, in customary amounts, of at least one of the conventional PVC stabilisers and/or additives, such as epoxy compounds, preferably epoxidised fatty acid esters, such as epoxidised soyabean oil, phosphites, organometallic compounds of metals of the second main group and subgroup of the periodic system, for example metal carboxylates or metal phenolates, especially those derived from carboxylic acids having 8 to 20 C atoms, or from phenols having 6 to 20 C atoms, such as calcium or zinc stearate, and also inorganic salts of metals of the second subgroup of the periodic system, for example, $ZnCl_2$, as well as organotin compounds, particularly monoorganotin compounds.

Co-stabilisers are preferably incorporated in amounts of 0.05 to 5, especially 0.1 to 3, % by weight. The ratio of pyrrole to co-stabilisers can be about 2:1 to 1:8.

Particularly suitable conventional phosphites are those of the general formulae VI, VII or VIII

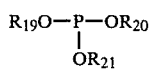 (VI)

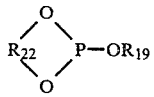 (VII)

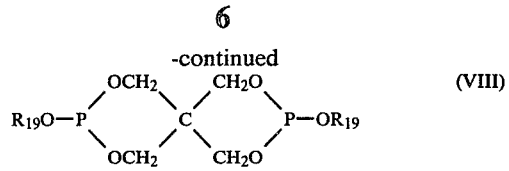 (VIII)

in which $R_{19}$, $R_{20}$ and $R_{21}$ independently of one another are $C_1$–$C_{18}$-alkyl, $C_1$–$C_{20}$-alkenyl, $C_6$–$C_{12}$-aryl, unsubstituted or hydroxy- or $C_1$–$C_4$-alkoxy-substituted $C_7$–$C_{19}$-alkaryl or $C_5$–$C_7$-cycloalkyl, and $R_{22}$ is $C_2$–$C_6$-alkylene which is unsubstituted or substituted by $C_1$–$C_{18}$-alkyl, $C_2$–$C_{13}$-alkoxymethyl or alkylthiomethyl or by phenyl, or is $C_6$–$C_{10}$-arylene which is unsubstituted or substituted by $C_1$–$C_4$-alkyl, or is $C_5$–$C_7$-cycloalkylene.

If $R_{19}$, $R_{20}$ and $R_{21}$ are $C_1$–$C_8$-alkyl, they can be, for example, methyl, ethyl, n-propyl, isopropyl, n-butyl, sec.-butyl, tert.-butyl, n-pentyl, n-hexyl, n-octyl, n-nonyl, decyl, dodecyl, tetradecyl, hexadecyl or octadecyl. Alkyl groups having 8–18 C atoms are preferred.

If $R_{19}$, $R_{20}$ and $R_{21}$ are $C_1$–$C_{20}$-alkenyl, they can be, for example, allyl, but-2-enyl, pentenyl, hexenyl, heptenyl or oleyl.

If $R_{19}$, $R_{20}$ and $R_{21}$ are aryl, they can be, for example, naphthyl, biphenyl or, preferably, phenyl.

As unsubstituted or hydroxy- or $C_1$–$C_4$-alkoxy-substituted $C_7$–$C_{19}$-alkaryl, $R_{19}$, $R_{20}$ and $R_{21}$ are, for example, tolyl, ethylphenyl, xylyl, cumyl, cymyl, cresyl, 4-methoxyphenyl, 2,4-dimethoxyphenyl, alkoxyphenyl or butoxyphenyl.

As $C_5$–$C_7$-cycloalkyl, $R_{19}$, $R_{20}$ and $R_{21}$ are, for example, cyclopentyl, cycloheptyl and especially cyclohexyl.

As unsubstituted or $C_1$–$C_{18}$-alkyl- or phenyl-substituted $C_2$–$C_6$-alkylene, $R_{22}$ can be, for example, methyl-, ethyl-, propyl-, isopropyl-, butyl-, hexyl-, decyl-, dodecyl-, tetradecyl-, octadecyl- or phenyl-substituted ethylene, propylene or hexamethylene, and especially 2-propyl-2-methyl-propylene, 1-propyl-2-ethyl-propylene, phenylethylene or unsubstituted ethylene.

As $C_2$–$C_{13}$-alkoxymethyl- or -alkylthiomethyl-substituted $C_2$–$C_6$-alkylene, $R_{22}$ can be, for example, ethoxymethylethylene, butoxymethylethylene, octoxymethylethylene or dodecylthiomethylethylene.

As unsubstituted or $C_1$–$C_4$-alkyl-substituted $C_6$–$C_{10}$-arylene, $R_{22}$ is, for example, tert.-butylphenylene or unsubstituted phenylene.

As $C_5$–$C_7$-cycloalkylene, $R_{22}$ is in particular cyclohexylene.

Amongst the phosphites of the formula VIII, those in which $R_{19}$ is $C_1$–$C_{18}$-alkyl and especially $C_8$–$C_{18}$-alkyl and in particular octyl or decyl are preferred.

Very particularly suitable phosphites are trioctyl, tridecyl, tridodecyl, tritetradecyl, tristearyl, trioleyl, triphenyl, tricresyl, tris-p-nonylphenyl or tricyclohexyl phosphite, and especially the aryl dialkyl phosphites and alkyl diaryl phosphites, for example phenyl-didecyl, nonylphenyl-didecyl and (di-tert.-butylphenyl)-didodecyl phosphite.

Particularly good stabilisation is achieved if at least one epoxy compound and/or a carboxylate or phenolate of a metal of the second main group of the periodic table, preferably a calcium carboxylate and especially calcium stearate, is added to the pyrroles of the formulae I to V. The stabilising action is even better if additionally at least one of the phosphites defined above or at least one zinc carboxylate or cadmium carboxylate or one organo-tin compound is employed. Amongst the organo-tin compounds, monoorgano-tin compounds are preferred.

However, very particularly good stabilisation is achieved if the chlorine-containing thermoplastics are stabilised with a mixture of at least one pyrrole of the formulae I to V, at least one epoxy compound and/or a carboxylate or phenolate of a metal of the second main group of the periodic table, at least one zinc carboxylate or cadmium carboxylate or one organo-tin compound, and at least one of the phosphites defined above.

Surprisingly, under these conditions even a relatively low concentration of a pyrrole of the formulae I to V ensures excellent stabilisation.

Preferably, vinyl chloride polymers or copolymers are used for the moulding materials according to the invention. Suspension polymers and mass polymers, and washed, i.e. low-emulsifier, emulsion polymers are preferred. Examples of suitable comonomers to use in the copolymers are vinyl acetate, vinylidene chloride, trans-dichloroethene, ethylene, propylene, butylene, maleic acid, acrylic acid, fumaric acid and itaconic acid. Other suitable chlorine-containing polymers are post-chlorinated PVC and chlorinated polyolefins, as well as graft polymers of PVC with EVA and MBS.

The thermoplastics stabilised according to the invention are prepared in accordance with known methods by incorporating the novel stabilisers, with or without additional stabilisers, into the polymer. A homogeneous mixture of stabiliser and PVC can be obtained, for example, on a twin-roll mixer at 150° to 210° C. Depending on the end use of the moulding material, other additives can also be incorporated before or simultaneously with the incorporation of a stabiliser, examples of such additives being lubricants (preferably montan waxes or glycerol esters), fatty acid esters, paraffins, plasticisers, fillers, modifiers (such as additives to improve the impact strength), pigments, light stabilisers, UV absorbers or other co-stabilisers, for instance antioxidants, especially phenolic antioxidants. The thermoplastics according to the invention can be converted to shaped articles by the moulding processes customary for this purpose, for example by extrusion, injection moulding or calendering. It is also possible to use plastisols.

The heat stabilisation achieved in the novel thermoplastic compositions by means of the stabilisers used according to the invention is excellent. The light stability is also good.

The examples which follow illustrate the invention. Unless stated otherwise, parts and percentages are by weight.

EXAMPLE 1

Test data, obtained by a method similar to DIN 53,381, page 3 (dehydrochlorination test), on stabilisers according to the invention.

Conc.: concentration relative to PVC (suspension PVC, K value 64)

Ind. time: time at which the dehydrochlorination curve begins to rise

Elim. time: time required to eliminate 0.5% of the available chlorine.

| Stabiliser No. | Stabiliser | Conc. | Ind. time (mins.) | Elim. time (mins.) |
|---|---|---|---|---|
| — | none | — | 12 | 40 |
| 1 | 2-Methyl-4-hydroxy-5-ethoxycarbonyl-pyrrole | 2.5 mmol % | >12 | >40 |
| 2 | 1-Phenyl-3-hydroxy-4-ethoxycarbonyl-pyrrole | 2.5 mmol % | >12 | >40 |
| 1 | 2-Methyl-4-hydroxy-5-ethoxycarbonyl-pyrrole Epoxidised soyabean oil | 2.5 mmol % 2% | >26 | >64 |
| 2 | 1-Phenyl-3-hydroxy-4-ethoxycarbonyl-pyrrole Epoxidised soyabean oil | 2.5 mmol % 2% | >26 | >64 |

EXAMPLE 2

Test data, obtained by a method similar to DIN 53,381, page 3 (dehydrochlorination test), on stabilisers according to the invention, with and without addition of further co-stabilisers, in accordance with the following formulations:

2(a) Suspension PVC (K value 64) without additives

| Dehydrochlorination test (180° C.) | | | | | |
|---|---|---|---|---|---|
| Exposure time [mins.] | 10 | 20 | 30 | 40 | 50 |
| Hydrogen chloride eliminated [%] | 0 | 0.09 | 0.23 | 0.37 | 0.53 |

2(b) 0.42 part of 2-methyl-4-hydroxy-5-ethoxycarbonyl-pyrrole
100 parts of suspension PVC (K value 64)

| Dehydrochlorination test (180° C.) | | | | | |
|---|---|---|---|---|---|
| Exposure time [mins.] | 10 | 20 | 30 | 40 | 50 |
| Hydrogen chloride eliminated [%] | 0 | 0.05 | 0.15 | 0.27 | 0.42 |

2(c) 0.42 part of 2-methyl-4-hydroxy-5-ethoxycarbonyl-pyrrole
100 parts of suspension PVC (K value 64)
0.55 part of phenyl didecyl phosphite

| Dehydrochlorination test (180° C.) | | | | | |
|---|---|---|---|---|---|
| Exposure time [mins.] | 10 | 20 | 30 | 40 | 50 |
| Hydrogen chloride eliminated [%] | 0 | 0.025 | 0.09 | 0.20 | 0.35 |

2(d) 0.42 part of 2-methyl-4-hydroxy-5-ethoxycarbonyl-pyrrole
100 parts of suspension PVC (K value 64)
2 parts of epoxidised soyabean oil
0.55 part of phenyl didecyl phosphite

| Dehydrochlorination test (180° C.) | | | | | |
|---|---|---|---|---|---|
| Exposure time [mins.] | 10 | 20 | 30 | 40 | 50 |

-continued

| Dehydrochlorination test (180° C.) | | | | | |
|---|---|---|---|---|---|
| Hydrogen chloride eliminated [%] | 0 | 0.007 | 0.025 | 0.055 | 0.10 |

2(e) 0.54 part of 1-phenyl-3-hydroxy-4-ethoxycarbonyl-pyrrole
100 parts of suspension PVC (K value 64)
2 parts of epoxidised soyabean oil

| Dehydrochlorination test (180° C.) | | | | |
|---|---|---|---|---|
| Exposure time [mins.] | 10 | 20 | 30 | 40 |
| Hydrogen chloride eliminated [%] | 0 | 0.025 | 0.075 | 0.19 |

2(f) 0.54 part of 1-phenyl-3-hydroxy-4-ethoxycarbonyl-pyrrole
100 parts of suspension PVC (K value 64)
2 parts of epoxidised soyabean oil
0.55 part of phenyl didecyl phosphite

| Dehydrochlorination test (180° C.) | | | | |
|---|---|---|---|---|
| Exposure time [mins.] | 10 | 20 | 30 | 40 |
| Hydrogen chloride eliminated [%] | 0 | 0.01 | 0.035 | 0.075 |

EXAMPLE 3

A dry mixture consisting of the ingredients shown in the formulations below is milled for 5 minutes on a mixing mill at 180° C. Test pieces of sheet 0.3 mm thick are taken from the mill hide formed. The sheet specimens are exposed to heat at 180° C. in an oven and at intervals of 10 minutes the Yellowness Index (YI) is determined on a specimen, according to ASTM D 1925-70. The results are summarised in the tables below.

3(a) 0.42 part of 2-methyl-4-hydroxy-5-ethoxycarbonyl-pyrrole
100 parts of suspension PVC (K value 64)
2 parts of epoxidised soyabean oil

| Static heat test (180° C.) | | | |
|---|---|---|---|
| Exposure time [mins.] | 0 | 10 | 20 |
| Yellowness Index | 15.2 | 55 | 120 |

3(b) 0.6 part of 2-methyl-4-hydroxy-5-ethoxycarbonyl-pyrrole
100 parts of suspension PVC (K value 58)
0.35 part of zinc stearate
4 parts of epoxidised soyabean oil
0.3 part of phenyl didecyl phosphite
0.7 part of lubricant*
0.5 part of flow promoter*
8.0 part of additive for improving impact strength*

*lubricant = mixture of low-molecular polyethylene, stearyl alcohol and stearyl stearate.
flow promoter = copolymer of acrylic acid esters and methacrylic acid esters.
additive for improving impact strength = terpolymer of methyl methacrylate, styrene and butadiene.

| Static heat test (180° C.) | | | | | | | | |
|---|---|---|---|---|---|---|---|---|
| Exposure | | | | | | | | |

| Static heat test (180° C.) | | | | | | | | |
|---|---|---|---|---|---|---|---|---|
| time [mins.] | 0 | 5 | 10 | 15 | 20 | 25 | 30 | 35 | 40 |
| Yellowness Index | 4.2 | 6.1 | 7.2 | 13.1 | 30.1 | 60.2 | 94.8 | 105 | 135 |

What is claimed is:

1. A chlorine-containing thermoplastic which contains a pyrrole of the formula I

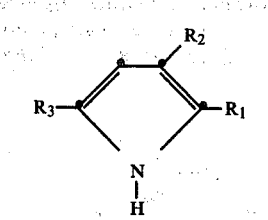

(I)

in which $R_1$ is alkyl, cycloalkyl, aryl, alkoxycarbonylmethyl, esterified or unesterified α-hydroxyalkyl, esterified or unesterified α-hydroxycycloalkylmethyl, esterified or unesterified α-hydroxyaralkyl, alkoxymethyl, alkylthiomethyl, aryloxymethyl, arylthiomethyl, cycloalkoymethyl, cycloalkylthiomethyl, aralkoxymethyl, aralkylthiomethyl, alkoxy, alkylthio, cycloalkoxy, cycloalkylthio, aralkoxy, aryalkylthio, aryloxy, arylthio, mercapto, mercaptomethyl, hydroxy, cyano, esterified or unesterified carboxyl, acyl or halogen, with the proviso that if $R_1$ is halogen, $R_2$ must not be halogen at the same time, $R_2$ is hydrogen, alkyl, cycloalkyl, aryl, esterified or unesterified α-hydroxyalkyl, in which the alkyl moiety can also jointly with $R_1$ be alkylene, esterified or unesterified α-hydroxycycloalkylmethyl, esterified or unesterified α-hydroxyaralkyl, alkoxy, cycloalkyloxy, aralkoxy, aryloxy, alkylthio, cycloalkylthio, aralkylthio, arylthio, alkoxymethyl, alkylthiomethyl, aryloxymethyl, arylthiomethyl, cycloalkoxymethyl, cycloalkylthiomethyl, aralkoxymethyl, arylalkylthiomethyl, hydroxyl, mercapto, mercaptomethyl or halogen, with the proviso that if $R_2$ is halogen, $R_1$ must not be halogen at the same time, and $R_3$ is hydroxyl or mercapto, with the further proviso that $R_1$ and $R_3$ cannot both be hydroxyl at the same time, or of the formula II

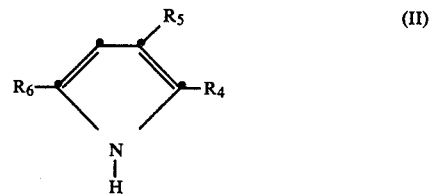

(II)

in which $R_4$ and $R_6$ are defined as for $R_2$, with the exclusion of hydrogen, but can both be halogen simultaneously, and $R_4$ can also be esterified or unesterified carboxyl, acyl or cyano, and $R_5$ is defined like $R_3$, with the further proviso that $R_4$ and $R_6$ cannot both be hydroxyl at the same time, or of the formula III

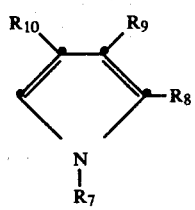

(III)

in which $R_7$ is alkyl, cycloalkyl, aryl, acyl or alkoxycarbonylalkyl, $R_8$ and $R_9$ are defined like $R_2$ and can both be halogen or hydrogen, and either $R_8$ or $R_9$ can additionally be esterified or unesterified carboxyl, acyl or cyano, and $R_{10}$ is defined like $R_3$, or of the formula IV

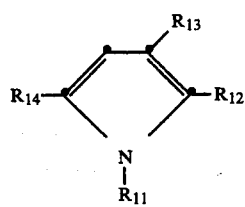

(IV)

in which $R_{11}$ is defined like $R_7$, $R_{12}$ like $R_1$ and $R_{13}$ like $R_2$, and $R_{12}$ and $R_{13}$ can both be hydrogen or halogen, and $R_{14}$ is defined like $R_3$, or of the formula V

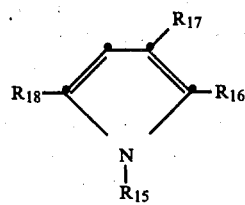

(V)

in which $R_{15}$ is defined like $R_7$, $R_{16}$ like $R_1$, $R_{17}$ like $R_3$ and $R_{18}$ like $R_2$, and $R_{16}$ and $R_{18}$ can both be hydrogen or halogen.

2. A chlorine-containing thermoplastic according to claim 1, which contains a pyrrole of one of the formulae I to V, in which $R_1$ is alkyl, aryl, alkoxy, aryloxy or acyl, $R_2$ is alkyl, aryl, alkoxy, aryloxy or hydroxyl, $R_3$ is hydroxyl, $R_4$ is alkyl, aryl, alkoxy, aryloxy or acyl, $R_5$ is hydroxyl, $R_6$ is alkyl, aryl, alkoxy, aryloxy or hydroxyl, $R_7$ is alkyl, aryl or acyl, $R_8$ is hydrogen, alkyl, aryl, alkoxy, aryloxy, hydroxyl or acyl, if $R_9$ is not acyl at the same time, $R_9$ is hydrogen, alkyl, aryl, alkoxy, aryloxy, hydroxyl or acyl, if $R_8$ is not acyl at the same time, $R_{10}$ is hydroxyl, $R_{11}$ is alkyl, aryl or acyl, $R_{12}$ is alkyl, aryl, alkoxy, aryloxy or acyl, $R_{13}$ is alkyl, aryl, alkoxy, aryloxy or hydroxyl, $R_{14}$ is hydroxyl, $R_{15}$ is alkyl, aryl or acyl, $R_{16}$ is hydrogen, alkyl, aryl, alkoxy, aryloxy or acyl, $R_{17}$ is hydroxyl and $R_{18}$ is hydrogen, alkyl, aryl, alkoxy, aryloxy or hydroxyl.

3. A chlorine-containing thermoplastic according to claim 1, which contains a pyrrole of one of the formulae I to V, in which $R_1$ is methyl, phenyl, methoxy, phenyloxy, acetyl or benzoyl, $R_2$ is methyl, phenyl, methoxy, phenyloxy or hydroxyl, $R_3$ is hydroxyl, $R_4$ is methyl, phenyl, methoxy, phenyloxy, acetyl, benzoyl or phenylaminocarbonyl, $R_5$ is hydroxyl, $R_6$ is methyl, phenyl, methoxy, phenyloxy or hydroxyl, $R_7$ is methyl, phenyl or acetyl, $R_8$ is hydrogen, methyl, phenyl, methoxy, phenyloxy, acetyl, benzoyl, phenylaminocarbonyl or hydroxyl, $R_9$ is hydrogen, methyl, phenyl, methoxy, phenyloxy, acetyl, benzoyl, phenylaminocarbonyl or hydroxyl, $R_{10}$ is hydroxyl, $R_{11}$ is methyl, phenyl or acetyl, $R_{12}$ is methyl, phenyl, methoxy, phenyloxy, acetyl, benzoyl or phenylaminocarbonyl, $R_{13}$ is methyl, phenyl, methoxy, phenyloxy or hydroxyl, $R_{14}$ is hydroxyl, $R_{15}$ is methyl, phenyl or acetyl, $R_{16}$ is hydrogen, methyl, phenyl, methoxy, phenyloxy, acetyl or benzoyl, $R_{17}$ is hydroxyl and $R_{18}$ is methyl, phenyl, methoxy or hydroxyl.

4. A chlorine-containing thermoplastic according to claim 1, which contains 2,3-di-phenyl-5-hydroxy-pyrrole, 2,5-di-phenyl-3-hydroxy-pyrrole, N-phenyl-2-methyl-3-phenylaminocarbonyl-4-hydroxy-pyrrole, 2-ethoxycarbonyl-3-hydroxy-5-methyl-pyrrole or N-phenyl-3-hydroxy-4-ethyloxycarbonyl-5-methyl-pyrrole.

5. A chlorine-containing thermoplastic according to claim 1, which contains from 0.05 to 5 percent by weight of a pyrrole of one of the formulae I to V.

6. A chlorine-containing thermoplastic according to claim 1, which additionally contains at least one epoxy compound.

7. A chlorine-containing thermoplastic according to claim 1, which additionally contains at least one phosphite.

8. A chlorine-containing thermoplastic according to claim 6, which additionally contains at least one phosphite.

9. A chlorine-containing thermoplastic according to claim 1, wherein the substrate is PVC.

* * * * *